US010130933B2

United States Patent
Zaman et al.

(10) Patent No.: US 10,130,933 B2
(45) Date of Patent: Nov. 20, 2018

(54) ZN—CEO$_2$—ZRO$_2$ CATALYST FOR HYDROGEN PRODUCTION VIA METHANOL PARTIAL OXIDATION

(71) Applicant: KING ABDULAZIZ UNIVERSITY, Jeddah (SA)

(72) Inventors: Sharif Fakhruz Zaman, Jeddah (SA); Muhammad A. Daous, Jeddah (SA); Abdulrahim Ahmad Alzahrani, Jeddah (SA); Lachezar Angelov Petrov, Jeddah (SA); Aibibula Bake, Jeddah (SA); Jamal Touitou, Jeddah (SA); Yahia Abobakor Saleh Alhamed

(73) Assignee: King Abdulaziz University, Jeddah (SA)

( * ) Notice: Subject to any disclaimer, the term of this patent is extended or adjusted under 35 U.S.C. 154(b) by 42 days.

(21) Appl. No.: 15/394,738

(22) Filed: Dec. 29, 2016

(65) Prior Publication Data

US 2018/0185823 A1 Jul. 5, 2018

(51) Int. Cl.
| | |
|---|---|
| *B01J 23/10* | (2006.01) |
| *B01J 37/04* | (2006.01) |
| *B01J 37/03* | (2006.01) |
| *B01J 37/08* | (2006.01) |
| *B01J 37/02* | (2006.01) |
| *C01B 3/32* | (2006.01) |

(52) U.S. Cl.
CPC ............ *B01J 23/10* (2013.01); *B01J 37/0236* (2013.01); *B01J 37/031* (2013.01); *B01J 37/04* (2013.01); *B01J 37/08* (2013.01); *C01B 3/326* (2013.01); *C01B 2203/0261* (2013.01); *C01B 2203/1076* (2013.01); *C01B 2203/1223* (2013.01)

(58) Field of Classification Search
CPC . B01J 23/10; B01J 23/06; B01J 21/066; B01J 37/08; B01J 37/031; B01J 37/04; B01J 37/0236; C01B 3/326; C01B 2203/1223; C01B 2203/1076; C01B 2203/0261
See application file for complete search history.

(56) References Cited

U.S. PATENT DOCUMENTS

| | | | |
|---|---|---|---|
| 4,091,086 A | 5/1978 | Hindin et al. | |
| 6,649,562 B2 * | 11/2003 | Naka ...................... | B01B 1/005 502/304 |
| 2007/0258882 A1 * | 11/2007 | Castellano ............... | B01J 23/63 423/648.1 |

OTHER PUBLICATIONS

Ledesma et al., "Hydrogen production by steam reforming of dimethyl ether over Cu—Zn/CeO2—ZrO2 catalytic monoliths," Chemical Engineering Journal 154 (2009) 281-286. (Year: 2009).*
Li et al., "Catalytic Partial Oxidation of Methanol over Copper-Zinc Based catalysts: A comparative Study of Alumina, Zirconia, and Magnesia as Promoters," Catal. Lett., 2010, vol. 140, pp. 69-76.

* cited by examiner

*Primary Examiner* — Anthony J Zimmer
(74) *Attorney, Agent, or Firm* — Richard C. Litman

(57) ABSTRACT

A catalyst composition for methanol partial oxidation for hydrogen production includes a zinc metal supported on a reducible porous oxide carrier. The zinc metal can vary from about 0.1 wt. % to about 30 wt. % of the catalyst composition. The catalyst composition can be used to produce hydrogen from methanol at high yield and with a low selectivity towards carbon monoxide (CO) production. The reducible porous oxide carrier includes a mechanical mixture of CeO$_2$ and ZrO$_2$.

3 Claims, 4 Drawing Sheets

ZN—CEO₂—ZRO₂ CATALYST FOR HYDROGEN PRODUCTION VIA METHANOL PARTIAL OXIDATION

BACKGROUND OF THE INVENTION

1. Field of the Invention

The present invention relates generally to catalysts for methanol oxidation, and particularly to a partial oxidation catalyst composition including Zn supported on porous mixed carriers consisting of $CeO_2$ and $ZrO_2$ for methanol partial oxidation to produce hydrogen at high yield and selectivity and low selectivity towards CO production.

2. Description of the Related Art

Hydrogen, among its various industrial applications, is considered the future mainstream energy carrier. This is particularly true for fuel cells where hydrogen and oxygen react to produce electricity and water as a byproduct. Fuel cells have better energy efficiency and are less harmful to the environment than conventional heat engines. Hydrogen has a very low density, which is a great disadvantage for its practical applications. For an effective use of fuel cells for on-board fuel cell driven vehicles, for example, it is desirable to provide either a hydrogen storage system with high capacity and a controllable release mechanism, or a practical mechanism to produce hydrogen on board. For an efficient production of clean hydrogen from hydrogen containing compounds, chemical compounds of high hydrogen content are the most suitable candidates. Methanol is one of the promising chemicals for such applications.

Hydrogen can be generated from methanol via different catalytic processes, e.g., methanol decomposition, methanol steam reforming, or methanol oxidative reforming and reactions. Each of these reactions, however, has particular technological disadvantages. For example, methanol decomposition as well as other catalytic processes produces hydrogen that contains considerable amounts of carbon monoxide (CO), which is known to be harmful to the platinum electrodes of fuel cells even at very low concentrations of 10 ppm. Methanol steam reforming is an endothermic reaction and needs an additional in situ steam generation unit, which requires additional energy. The oxidation reaction in oxidative reforming may face reaction control difficulties.

Partial oxidation of methanol (POM) is an exothermic reaction and does not need the addition of steam. It is thermodynamically favorable at atmospheric pressure. Current known catalysts for methanol partial oxidation, however, face major drawbacks of high CO selectivity and rapid deactivation. In developing catalysts for hydrogen production via POM, one of the main challenges has been achieving a catalyst that has low selectivity toward CO production. Two reaction parameters critical for obtaining good performance of the POM catalysts include (i) reaction temperature and (ii) a molar ratio of $O_2$ and $CH_3OH$ in a reaction mixture. It would be desirable to develop catalysts for partial oxidation of methanol having high hydrogen selectivity and low carbon monoxide selectivity.

Thus, a catalyst solving the aforementioned problems is desired.

SUMMARY OF THE INVENTION

A catalyst composition for methanol partial oxidation includes a zinc metal supported on a reducible porous oxide carrier. The catalyst with such composition can be used to produce hydrogen from methanol at high yield and with a low selectivity towards carbon monoxide (CO) production. The zinc metal can vary from about 0.1 wt. % to about 30 wt. % of the catalyst composition, for example about 0.1 wt. % to about 15 wt. % of the catalyst composition or about 0.1 wt. % to about 12 wt. % of the catalyst composition. In this embodiment, the zinc metal can form less than about 10 wt. % of the catalyst composition. The porous carrier includes $CeO_2$ and $ZrO_2$. The catalyst composition can include about 10 wt. % to about 80 wt. % $CeO_2$, e.g., about 30 wt. % to about 80 wt. % $CeO_2$. The catalyst composition can include about 10 wt. % to about 75 wt. % $ZrO_2$, e.g., about 10 wt. % to about 50 wt. % $ZrO_2$.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
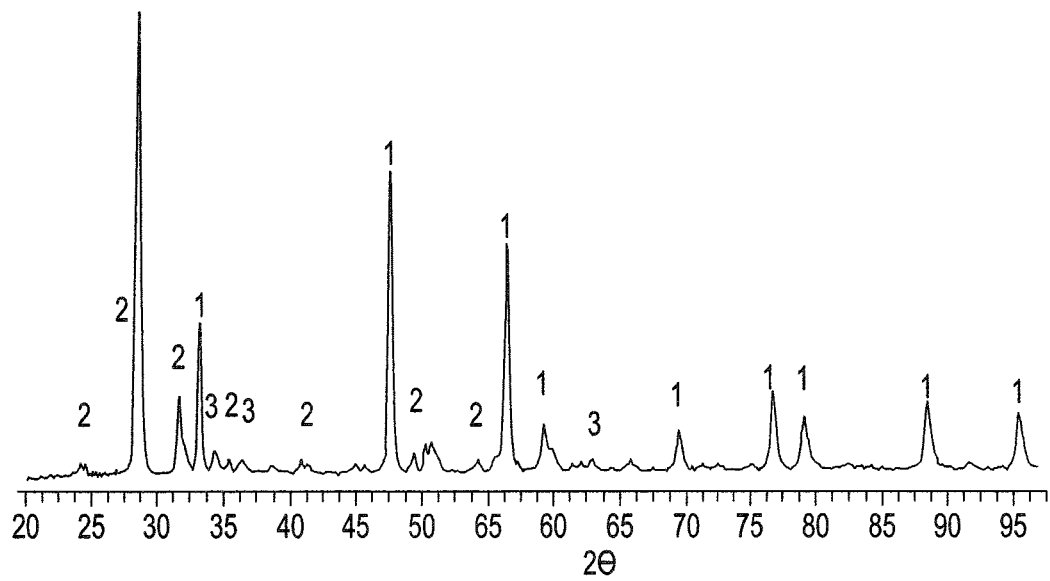
FIG. 1 is the X-ray diffraction (XRD) spectrum of Sample 1 catalyst.

A catalyst composition for methanol partial oxidation includes a zinc metal supported on a reducible porous oxide carrier. The catalyst with this composition can be used to produce hydrogen from methanol at high yield and with a low selectivity towards carbon monoxide (CO) production. The zinc metal can form from about 0.1 wt. % to about 30 wt. % of the catalyst composition, for example about 0.1 wt. % to about 15 wt. % of the catalyst composition or about 0.1 wt. % to about 10 wt. % of the catalyst composition. In an embodiment, the zinc metal can form less than about 10 wt. % of the catalyst composition. The carrier or support of the active components includes mixed oxides with low surface area typically ranging from 5-10 $m^2/gm$. The porous carrier includes a mechanical mixture of $CeO_2$ and $ZrO_2$. The catalyst composition can include about 10 wt. % to about 80 wt. % $CeO_2$, e.g., about 30 wt. % to about 80 wt. % $CeO_2$. The catalyst composition can include about 10 wt. % to about 75 wt. % $ZrO_2$, e.g., about 10 wt. % to about 50 wt. % $ZrO_2$. A working temperature of the catalyst can range from about 325° C. to about 550° C.

The catalyst can be prepared by combining zirconia and ceria to form a mixture, combining the zirconia-ceria mixture with zinc to form a solid, drying the solid, and calcining the dried solid in the presence of oxygen or air flow. During the calcination step, a particular temperature regime is maintained to ensure the formation of spinels and/or corundum like structures having chemical formula $Ce_xZr_yO_2$, wherein x=0.8-0.05 and y=0.4-0.95. For example, the amount of $CeO_2$ can vary from about 50.0 wt. % to about 75 wt. %, and the amount of $ZrO_2$ can vary from about 10 wt. % to about 30 wt. %.

According to an embodiment, the catalyst composition for partial oxidation of methanol can be formed by mixing cerium oxide and zirconium oxide under ultrasonic conditions to form a mixture; adding the mixture into an aqueous solution of zinc salt held at about 65° C. while stirring for about 4 hours; and isolating a solid methanol oxidation catalyst precursor by evaporating off water from the aqueous solution. The solid is then dried at a temperature of about 100° C. for about 15 hours followed by calcining the dried solid at a temperature of about 500° C. for about 5 hours in the presence of air. The zinc salt can be any zinc containing salt, e.g., zinc nitrate $Zn(NO_3)_2$ or zinc chloride ($ZnCl_2$). The zinc salt solution typically has a concentration ranging from about 0.01 M to about 0.13 M.

To produce hydrogen by partial oxidation of methanol, a mixture of methanol and oxygen gas having a molar ratio of 1:0.5 can be passed over the catalyst at a temperature ranging from about 325° C. to about 450° C. and at atmospheric pressure. During the synthetic process, a flow rate of the mixture of methanol and oxygen gas is maintained at about 50 $cm^3$ $min^{-1}$. The methanol can be heated to 120° C. and combined with helium carrier gas before being mixed with oxygen gas. Further, the mixture of methanol and oxygen gas was pre-heated to 120° C. before contacting the methanol oxidation catalyst. The zinc containing methanol oxidation catalyst supported on the ceria and zirconia can be in powder form.

The present technology, thus generally described, will be understood more readily by reference to the following examples, which is provided by way of illustration and is not intended to limit the scope of the present technology.

Example 1

Preparation of the Catalyst for Methanol Partial Oxidation Using Zinc Nitrate (Sample 1)

The catalyst was prepared by impregnation method. 7.5 g of dried cerium oxide and 2.5 g of zirconium oxide were admixed ultra-sonically for 1 h. 0.913 g of zinc nitrate hexa-hydrate was dissolved in 40 ml of distillated water in a Rotavapor flask at 65° C. 0.8 g of the zirconia-ceria mixture was heated to 65° C. and added to the zinc containing solution heated at 65° C. and left under rotation for 4 hours. The water was then evaporated off from the solution. The remaining solid included zinc supported on ceria and zirconia. The solid was collected and dried at 100° C. for 15 hours. The dried solid was then calcined in the presence of air for 5 hours at 500° C. to provide Sample 1 catalyst. FIG. 1 illustrates the X-ray powder diffraction (XRD) of Sample 1 catalyst.

Example 2

Preparation of the Catalyst for Methanol Partial Oxidation Using Zinc Chloride (Sample 2)

The catalyst was prepared by impregnation method. 7.5 g of cerium oxide and about 2.5 g of zirconium oxide were mixed ultra-sonically for 1 hour. 0.062 g of zinc dichloride was placed in a Rotavapor flask and dissolved in 40 ml of distillated water at 65° C. Then 0.97 g of the ceria-zirconia mixture heated to 65° C. was added to the zinc containing solution and left under rotation for 4 hours at 65° C. The water was then removed. The remaining solid included zinc supported on ceria and zirconia. The solid was collected and dried at 100° C. for 15 hours. The dried solid was then calcined in the presence of air for 5 hours at 500° C.

Example 3

Catalytic Activity Stability of Sample 1

The partial oxidation of methanol for hydrogen production experiments used the catalyst (Sample 1) prepared as described in Example 1. The catalyst was pelletized and then grounded. A fraction of the grain size, between 0.1-0.3 mm, was selected and used in the reaction without any further treatment. The reaction was carried out in (PID Eng tech system Spain), with a flow type quartz reactor having 3 mm inner diameter and 5 mm outside diameter. The catalyst (100 mg) was placed in a quartz reactor and stabilized with the help of quartz wool. The quartz reactor was then placed in an electric oven equipped with a temperature controller. The temperature was measured with a thermocouple having the sensor tip element located at the center of the catalytic bed.

Partial oxidation of methanol was performed using a molar ratio of $CH_3OH:O_2$ of 1:0.5, and mixed with helium, with a total flow of 50 $cm^3$ $min^{-1}$. Methanol was delivered using a Bronkhorst High-Tech B.V. controlled evaporation mixing (CEM) liquid delivery system with incorporated readout/control unit. This unit precisely controls the amount of liquid/gas mixture introduced in the system with a high reproducibility. About 0.52 $cm^3$ $h^{-1}$ of methanol was delivered to the evaporation mixing system where the methanol was heated to 120° C. then mixed with 20 $cm^3$ $min^{-1}$ of helium carrier gas. A mixture of oxygen and helium gas were introduced via mass flow controller at a flow of 2.1 $cm^3$ $min^{-1}$ with 18.6 $cm^3$ $min^{-1}$ respectively, which produced a total flow of 50 ml $min^{-1}$. The gas mixture was then introduced to a mixing chamber pre-heated at 120° C. and finally to the catalytic reactor. The reaction products were analyzed using on-line connected gas chromatograph (Varian CP-4900) with two columns (MS-5A and 5CB) coupled with a TCD detector. The catalytic reaction was carried out at atmospheric pressure and temperatures between about 325° C. and about 450° C. All measurements were performed when the reaction reached a steady state.

Catalyst sample 1 was tested for the partial oxidation of methanol. Activity and selectivity tests were performed at different temperatures (from 325° C. to 450° C.) and the results are presented in Table 1 below. Table 1 shows the catalytic activity (degree of methanol conversion $X_{CH3OH}$), Hydrogen selectivity % $S_{H2}$ and CO selectivity % $S_{CO}$ of Sample 1 catalyst for POM reaction at different temperatures.

TABLE 1

| Reaction Temperature | Catalyst of Sample 1 | | |
|---|---|---|---|
| ° C. | % $X_{CH3OH}$ | % $S_{H2}$ | % $S_{CO}$ |
| 325 | 19.70 | 0.00 | 4.34 |
| 350 | 47.47 | 62.22 | 12.12 |
| 375 | 88.61 | 94.73 | 11.62 |
| 400 | 99.60 | 96.03 | 8.66 |
| 425 | 100.00 | 97.80 | 7.23 |
| 450 | 100.00 | 95.12 | 4.27 |

The methanol conversion, hydrogen and CO selectivity were calculated according to the following formulas:

$$\text{CH}_3\text{OH conversion (mol \%)} = \left(\frac{\text{moles of CH3OH in} - \text{moles of CH3OH consumed}}{\text{moles of CH3OH in}}\right) \times 100$$

$$\text{H}_2 \text{ selectivity} = \left(\frac{\text{moles of H2 produced}}{\text{moles of CH3OH consumed} \times 2}\right) \times 100$$

$$\text{CO selectivity (\%)} = \left(\frac{\text{moles of CO produced}}{\text{moles of CH3OH consumed}}\right) \times 100$$

At the lowest reaction temperature of 325° C., the catalyst of Sample 1 shows a low degree of conversion of methanol. An increase in the reaction temperature resulted in an increase in the methanol conversion and full methanol conversion was obtained at 425° C. An increase in hydrogen selectivity with the increase in temperature followed a similar pattern having a maximum selectivity of 97.9% achieved at 425° C. However, at temperatures higher than 425° C. and up to 450° C. the hydrogen selectivity continued to decrease.

Figure 2:
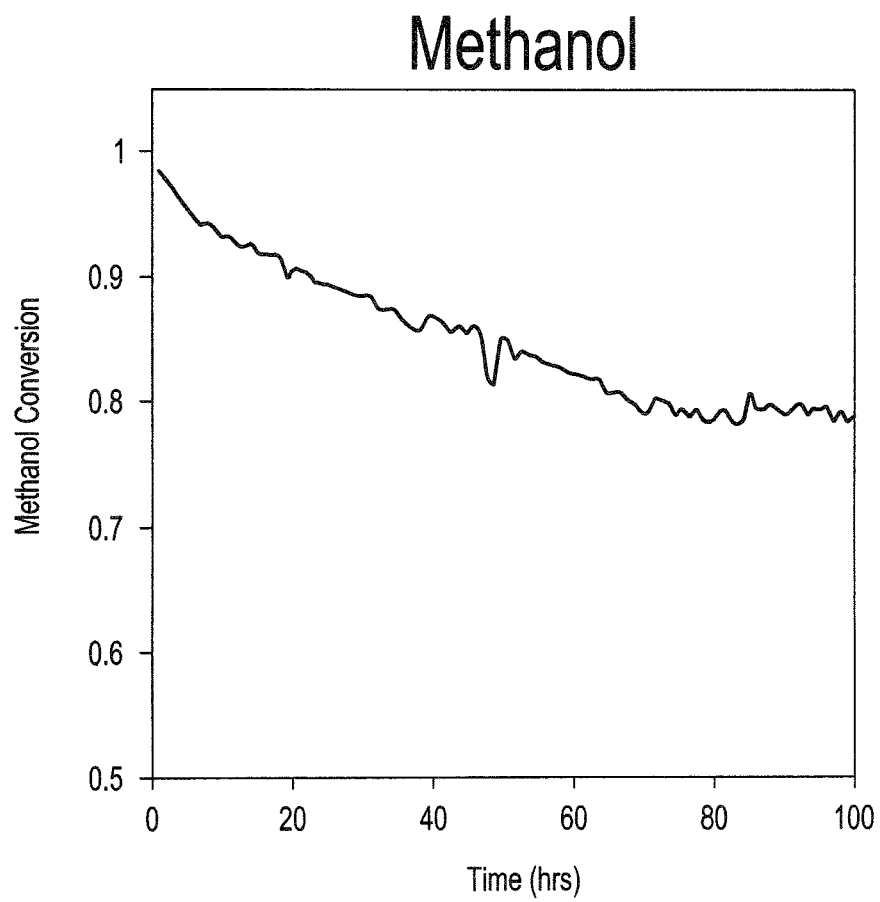
FIG. 2 shows the stability test for methanol conversion on Sample 1 catalyst in partial oxidation of methanol (POM) reaction.
Figure 3:
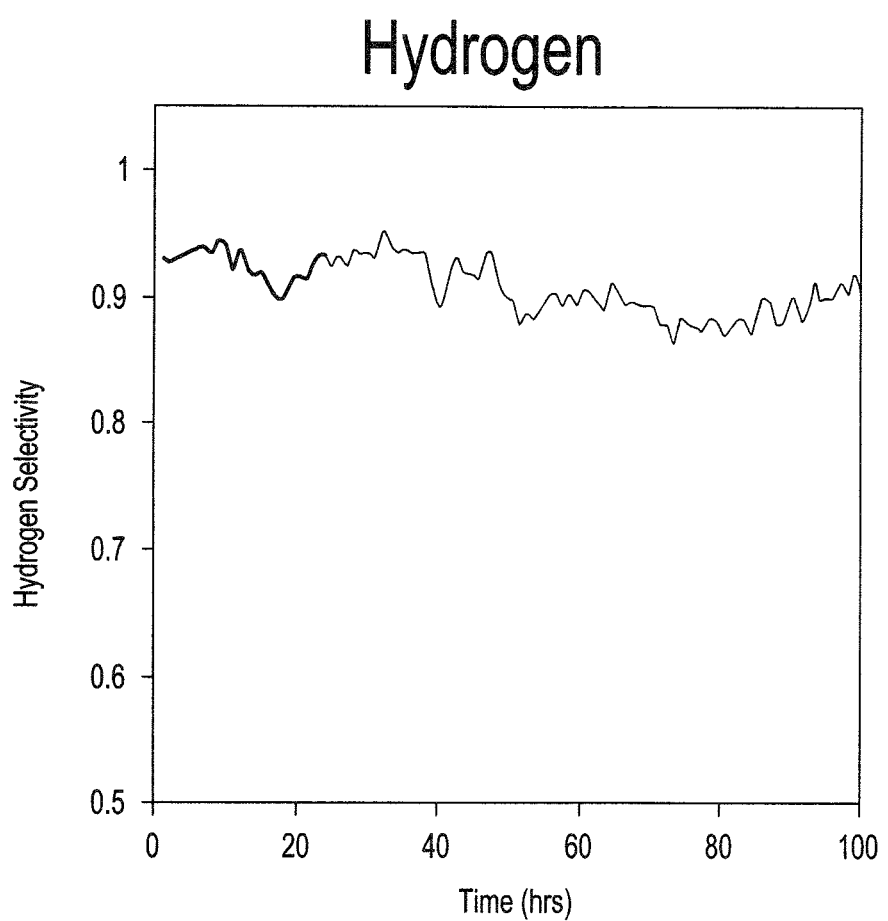
FIG. 3 shows stability test of hydrogen selectivity on Sample 1 catalyst in POM reaction.
Figure 4:
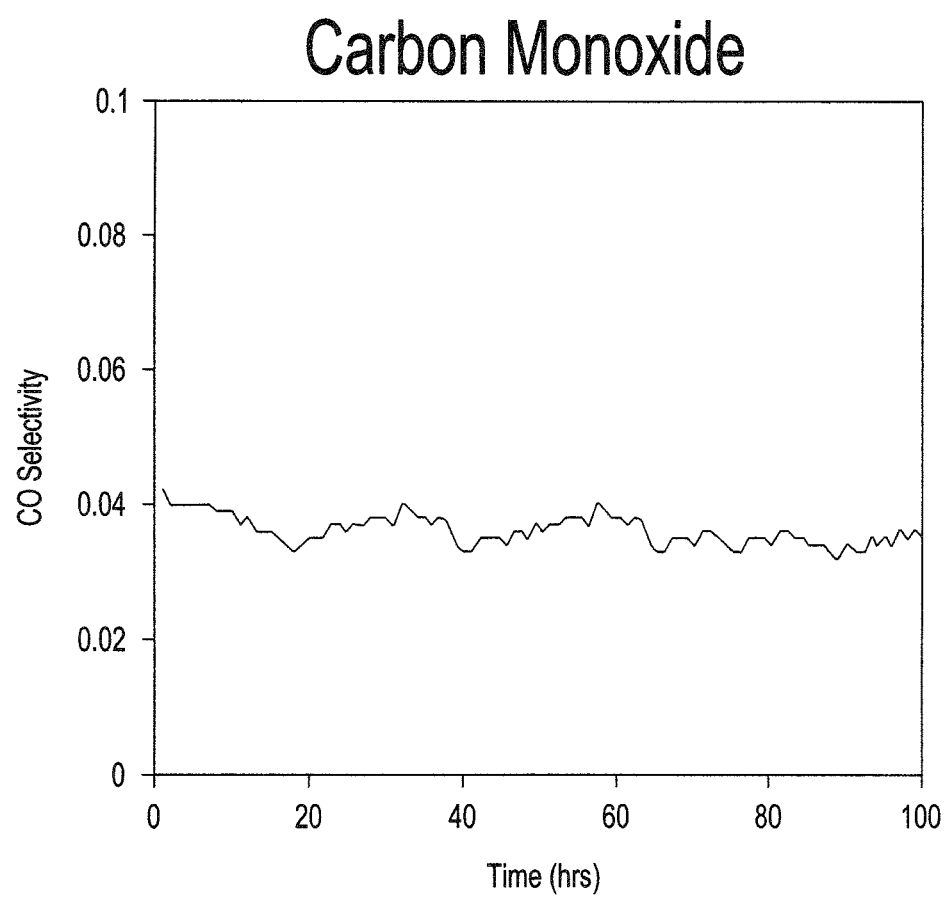
FIG. 4 shows the stability test of carbon monoxide (CO) selectivity on Sample 1 catalyst in POM reaction.

Catalyst Sample 1 was tested for long run stability tests for the partial oxidation of methanol. Tests were performed for 100 hours at 400° C. and the results are presented in the exemplary figures. High conversion of methanol around 98% was achieved at the start of the experiment as illustrated in FIG. 2. Then a progressively slow decrease was observed during the next 70 hours of operation where the methanol conversion was stabilized at about 80%. FIG. 3 shows that the hydrogen selectivity was high and stable during the stability run, fluctuating between 90% and 95%. FIG. 4 illustrates that the selectivity of the carbon monoxide was low (~4% selectivity), but was stable during the stability testing run.

The catalyst composition is effective in the partial oxidation of methanol due to the presence of zinc metal which is impregnated in the mixed oxide carrier support. The process provides high methanol conversion efficiency, high yield of hydrogen and a low selectivity towards carbon monoxide (CO) production.

It is to be understood that the present invention is not limited to the embodiments described above, but encompasses any and all embodiments within the scope of the following claims.

We claim:

1. A Zn—CeO$_2$—ZrO$_2$ catalyst for hydrogen production via methanol partial oxidation, consisting of:
   0.1 wt. % to 15 wt. % of a zinc metal;
   a porous oxide carrier supporting the zinc metal, the porous oxide carrier including zirconia and ceria, wherein the ceria comprises between about 30 wt. % to about 80 wt. % of the catalyst composition and the zirconia comprises between about 10 wt. % to about 50 wt. % of the catalyst composition.

2. The Zn—CeO$_2$—ZrO$_2$ catalyst for hydrogen production via methanol partial oxidation according to claim 1, wherein the porous oxide carrier includes spinel phase with a general formula Ce$_x$Zr$_y$O$_2$, wherein x=0.6-0.05 and y=0.41-0.95.

3. A process for manufacturing the catalyst according to claim 1, consisting of:
   admixing cerium oxide and zirconium oxide to form a mixture;
   adding the mixture into an aqueous solution of zinc salt held at about 65° C. while stirring for about 4 hours;
   isolating a solid product by evaporating water from said aqueous solution, wherein isolating the solid product includes drying the aqueous solution at a temperature of 100° C. for 15 hours to produce the solid product; and
   calcining the solid product to produce the catalyst composition, wherein calcining the dried solid includes calcining at a temperature of 500° C. for 5 hours.

\* \* \* \* \*